US010995820B2

(12) United States Patent
Sanders et al.

(10) Patent No.: US 10,995,820 B2
(45) Date of Patent: May 4, 2021

(54) APPARATUS AND METHOD FOR MAGNETICALLY UNLOADING A ROTOR BEARING

(71) Applicant: Amber Kinetics, Inc., Union City, CA (US)

(72) Inventors: Seth R. Sanders, Berkeley, CA (US); Peter Thomas Tennessen, Oakland, CA (US); Daniel Bakholdin, Newbury Park, CA (US); Matthew Brandon Garten, Mountain View, CA (US); Mark J. Holloway, Mountain View, CA (US); Matthew K. Senesky, Berkeley, CA (US)

( * ) Notice: Subject to any disclaimer, the term of this patent is extended or adjusted under 35 U.S.C. 154(b) by 252 days.

(21) Appl. No.: 15/824,204

(22) Filed: Nov. 28, 2017

(65) Prior Publication Data

US 2018/0080525 A1  Mar. 22, 2018

Related U.S. Application Data

(63) Continuation-in-part of application No. 13/973,937, filed on Aug. 22, 2013, now Pat. No. 9,892,839, and
(Continued)

(51) Int. Cl.
*H02K 7/02* (2006.01)
*H02K 7/09* (2006.01)
(Continued)

(52) U.S. Cl.
CPC ........ *F16F 15/3156* (2013.01); *F16C 19/522* (2013.01); *F16C 19/547* (2013.01);
(Continued)

(58) Field of Classification Search
CPC .......... H01F 7/206; H01F 7/20; H01F 7/0236; F16C 35/04; F16C 35/067; F16C 35/077;
(Continued)

(56) References Cited

U.S. PATENT DOCUMENTS 5,836,739 A * 11/1998 Haramura ............. F01D 25/168
415/104
6,029,538 A * 2/2000 Little .................... F16C 35/077
384/624
(Continued)

FOREIGN PATENT DOCUMENTS

WO WO-2007111032 A1 * 10/2007 ............ F16C 25/083

OTHER PUBLICATIONS

WO-2007111032-A1 (English Translation) (Year: 2007).*

*Primary Examiner* — Quyen P Leung
*Assistant Examiner* — Alexander Moraza
(74) *Attorney, Agent, or Firm* — Soquel Group LLC

(57) ABSTRACT

A flywheel apparatus that magnetically unloads a top rotor bearing is described. The apparatus includes a flywheel housing, a rotor with a vertical axis of rotation that includes a magnetic material, a magnet configured to apply a desired upward off-loading force along the vertical axis of rotation, an upper bearing connected to an upper shaft of the rotor, and a bearing housing disposed between the upper bearing and the flywheel housing that substantially prevents downward axial motion of the upper bearing. The magnet includes an electromagnet. A force sensor is used to measure a force on the upper bearing which is provided as input to a controller that updates the current to the electromagnet. The rotor is maintained in a fixed axial position and a spring disposed below a lower bearing absorbs axial dimension growth of the rotor.

17 Claims, 14 Drawing Sheets

Related U.S. Application Data a continuation-in-part of application No. 15/191,398, filed on Jun. 23, 2016, now Pat. No. 10,240,660.

(60) Provisional application No. 61/692,631, filed on Aug. 23, 2012, provisional application No. 62/185,441, filed on Jun. 26, 2015.

(51) Int. Cl.
| | | |
|---|---|---|
| *F16C 39/06* | (2006.01) | |
| *F16F 15/315* | (2006.01) | |
| *H01F 7/02* | (2006.01) | |
| *H02K 7/08* | (2006.01) | |
| *F16C 19/54* | (2006.01) | |
| *F16C 19/52* | (2006.01) | |
| *F16C 32/04* | (2006.01) | |
| *F16C 19/16* | (2006.01) | |

(52) U.S. Cl.
CPC .......... *F16C 32/0408* (2013.01); *F16C 39/06* (2013.01); *F16C 39/063* (2013.01); *H01F 7/0231* (2013.01); *H02K 7/02* (2013.01); *H02K 7/025* (2013.01); *H02K 7/083* (2013.01); *H02K 7/09* (2013.01); *F16C 19/163* (2013.01); *F16C 32/0444* (2013.01); *F16C 2361/55* (2013.01); *Y02E 60/16* (2013.01)

(58) Field of Classification Search
CPC ...... F16C 19/163; F16C 19/522; F16C 39/06; F16C 39/063; F16C 2361/55; H02K 7/02; H02K 7/025
USPC ........... 310/90.5, 74; 318/161, 162; 74/5.95, 74/433.5, 572.1, 572.2, 572.11, 574.1
See application file for complete search history.

(56) References Cited

U.S. PATENT DOCUMENTS

| | | | |
|---|---|---|---|
| 6,710,489 B1* | 3/2004 | Gabrys | H02K 7/025 |
| | | | 310/74 |
| 2002/0037229 A1* | 3/2002 | Sjoholm | F01C 21/02 |
| | | | 418/201.1 |
| 2009/0127956 A1* | 5/2009 | Ozaki | F01D 15/005 |
| | | | 310/90.5 |
| 2012/0144939 A1* | 6/2012 | Kullin | H01J 35/101 |
| | | | 74/25 |

* cited by examiner

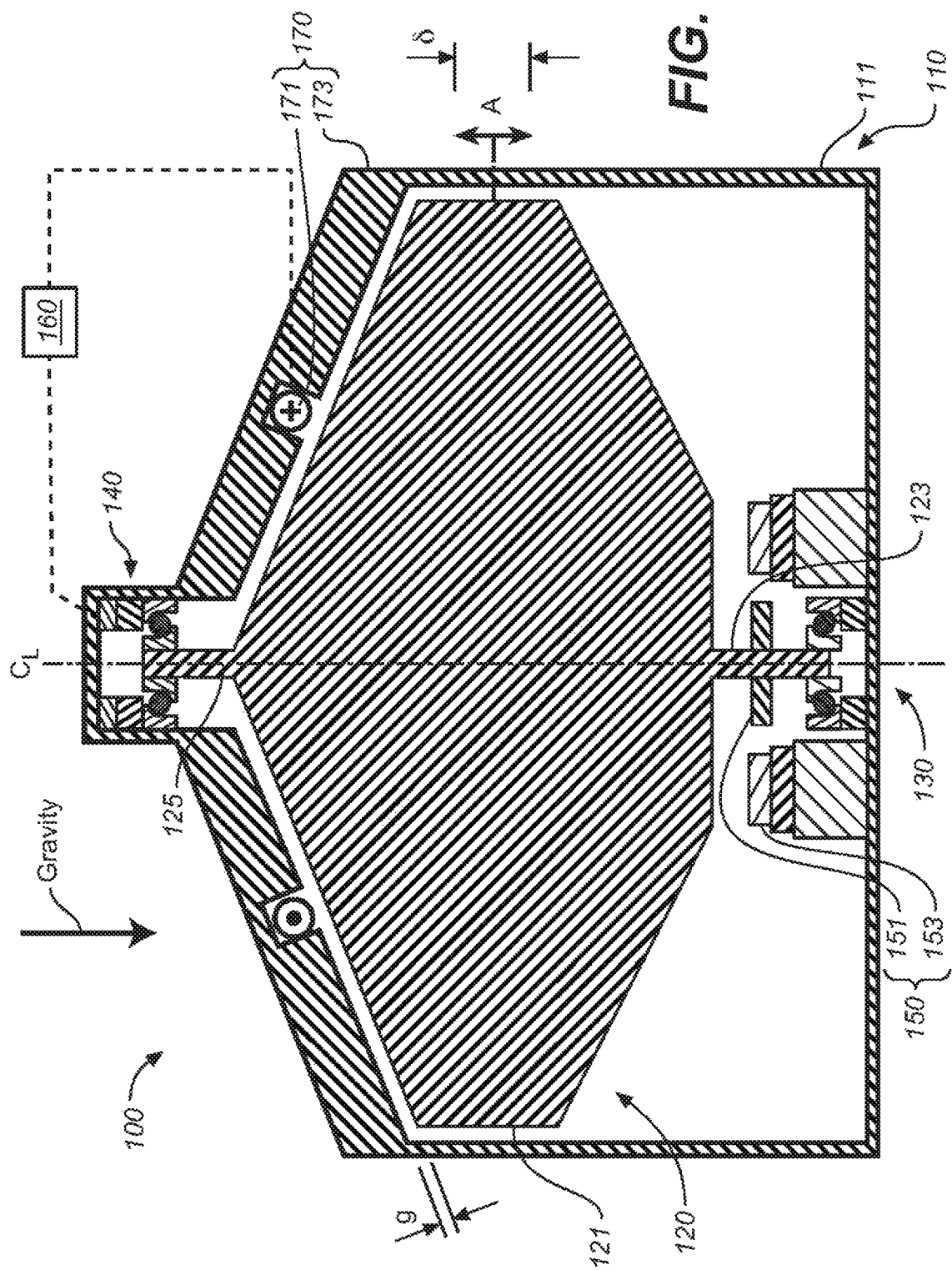

APPARATUS AND METHOD FOR MAGNETICALLY UNLOADING A ROTOR BEARING

CROSS-REFERENCE TO RELATED APPLICATIONS

This application is a continuation-in-part of U.S. application Ser. No. 13/973,937, filed Aug. 22, 2013 which claims the benefit of U.S. Provisional Application No. 61/692,631, filed Aug. 23, 2012, the disclosures of which are incorporated herein by reference in their entireties. This application is also a continuation-in-part of U.S. application Ser. No. 15/191,398 filed on Jun. 23, 2016 which claims benefit of U.S. Provisional Application No. 62/185,441 filed on Jun. 26, 2015, the disclosures of which are also incorporated herein by reference in their entireties.

BACKGROUND OF THE INVENTION

Field of the Invention

The present invention generally relates to rotors supported by mechanical bearings, and more particularly to a method and apparatus for unloading the weight of the rotor from its bearings.

Discussion of the Background

Rotors, such as those used for storing rotational kinetic energy, have shafts along their axis of rotation that are typically supported by rolling bearings. Thus, for example, a vertically oriented rotor may have a lower rolling bearing and an upper rolling bearing. For such configurations, the lower bearing must usually be designed to support the weight of the rotor.

While the use of rolling bearings to support rotors is effective, the typical use of such bearings requires large bearings. Thus, for example rotors used for energy storage may have a weight in excess of 1,000 pounds. Roller bearings capable of supporting large weights are necessarily large and expensive. In addition, as is known in the field, ball bearing lifetime is limited by raceway fatigue, and scales inversely with the cubic power of the bearing load.

There exists a need for an apparatus and method that can reduce the axial load on the roller bearing supporting a rotor. The apparatus and method should be compatible with existing rotor designs and be easy to implement. The apparatus and method should also provide for longer bearing lifetimes.

BRIEF SUMMARY OF THE INVENTION

The present invention overcomes the disadvantages of prior art rotor support apparatus and methods by unloading a large fraction of the weight supported by the bearings of a vertically mounted rotor. In one embodiment, the load on the upper bearing is magnetically unloaded to a minimal preload setting. In one embodiment, this amount of preloading is accomplished by applying a magnetic lifting force that exceeds, by a small margin, the gravitational weight of the rotor. This small difference between magnetic lifting force and rotor weight constitutes the preload placed on the upper bearing. The present invention also comprises the mechanical layout, and the controls needed to accurately prescribe the residual axial preload on the upper bearing.

Certain embodiments of the present invention, referred to as flipped bearing embodiments, fix the axial position of the upper bearing such that the rotor does not travel upward during normal operation. A magnetic control system maintains a desired magnetic offloading, or lifting, force on the rotor. Axial dimension growth of the rotor and shaft are accommodated by placing a spring in series with a lower bearing, rather than allowing the upper bearing to travel axially along an upper shaft.

Characteristics of this approach include: first, loading on the bottom bearing can be entirely and precisely set with an axial spring. Second, with slip-fit mountings for the lower bearing outer rings (or raceways) in their respective bores, the rotor can travel a small axial distance. This clearance is provided to allow for differential expansion of the rotor and housing under mismatched thermal conditions, and under Poisson effect induced rotor axial length variation due to centripetal loading. With the rotor in a stopped position defined by the upper bearing assembly, the gap defining magnetic actuation forces is precisely set. As such, the magnetic lifting force of a prescribed winding current is very accurate and repeatable. Further, since the magnetic gap is at a minimal setting, the power required by a magnetic lifting winding is minimal. Third, an axial preloading force is imparted on the upper bearing. This preloading force is determined by the difference between the magnetic lifting force and the gravitational weight of the rotor. The axial preloading force is maintained by a magnetic control system.

Certain embodiments provide a flywheel apparatus that includes a flywheel housing, a rotor having a rotor weight and a vertical axis of rotation aligned with gravity, where the rotor stores energy while it rotates about the vertical axis of rotation, and where the rotor includes a magnetic material, a magnet, connected to the flywheel housing, configured to apply a desired upward off-loading force along the vertical axis of rotation, which counters the force of gravity on the rotor, an upper bearing connected to an upper shaft of the rotor that permits rotation of the rotor about the axis of rotation, and a bearing housing disposed between the upper bearing and the flywheel housing that substantially prevents downward axial motion of the upper bearing.

In certain embodiments, the apparatus includes a control system that provides a current to the electromagnet sufficient to operate the flywheel with the rotor in a fixed axial position.

In certain embodiments, rotor is maintained in a fixed axial position and a spring disposed below a lower bearing absorbs axial dimension growth of the rotor.

BRIEF DESCRIPTION OF THE SEVERAL VIEWS OF THE DRAWING

FIG. 1 is a schematic cross-sectional view of a first embodiment flywheel apparatus of the present invention;

FIG. 2A shows the rotor in an extreme lower position, and FIG. 2B shows the rotor in an extreme upper position;

Figure 2A:
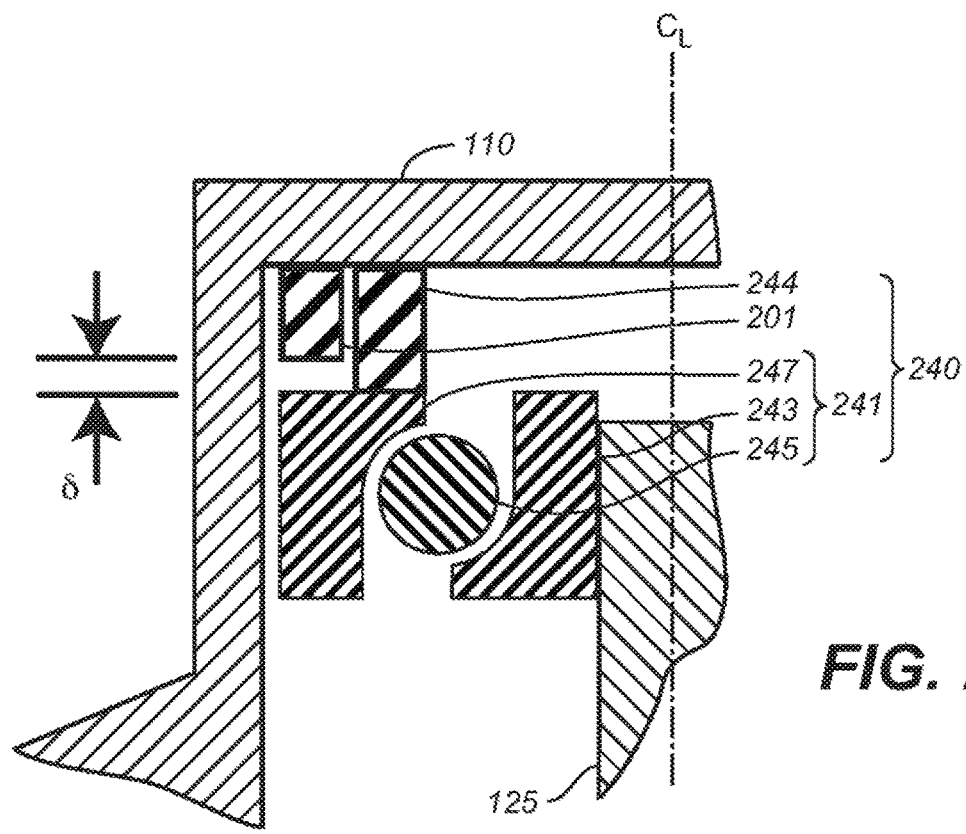
FIGS. 2A and 2B are schematic cross-sectional views of a first embodiment upper bearing assembly, where

Reference symbols and labels are used in the Figures to indicate certain components, aspects or features shown therein, with reference symbols and labels common to more than one Figure indicating like components, aspects or features shown therein.

DETAILED DESCRIPTION OF THE INVENTION

The following description describes, in detail, specific embodiments of an apparatus and method that provides for magnetic unloading of conventional roller bearings that support a rotor. Unloading of rotor bearings reduces the running friction and also increases the bearing lifetime. Thus, for the example of the use of a rotor in a flywheel energy storage system, the inventive unloading can reduce the running friction to negligible levels and extend bearing lifetime by orders of magnitude. In addition, the inventive structure and method provides magnetic support for a rotor at its minimal possible setting such that the power required by a magnetic lifting winding is minimal.

FIG. 1 is a schematic cross-sectional view of a first embodiment flywheel apparatus 100 which includes a housing 110, a rotor 120 having a rotational axis CL, and bearings for supporting the rotor and permitting rotation, and which may include a lower bearing assembly 130 and an upper bearing assembly 140. Flywheel apparatus 100 also includes a magnet 170; power components 150 for adding or removing power from rotor 120; and a magnetic offloading control system 160. Flywheel apparatus 100 and bearing assemblies 130 and 140 are generally symmetric about a centerline CL. As discussed subsequently, bearing assemblies 130 and 140 support rotor 120 while permitting some axial motion of the rotor, indicated by arrow A, and where the total range of axial motion is indicated as $\delta$.

As discussed subsequently, magnet 170 includes an electro-magnet, which is also referred to herein without limitation, as an "offloader" or "offloader electromagnet," which may be operated to provide a force on rotor 120 that is counter to the gravitational force. When the electro-magnet of magnet 170 is actuated, such as by a current applied by control system 160, the rotor may move upwards by, for example, the indicated distance $\delta$. In one embodiment, a minimal distance, $\delta$, may be for example, from 0.25 mm (0.01 inches) to 1.0 mm (0.04 inches), to allow for anticipated differential expansion.

A portion of the support of rotor 120 is thus transferred to magnet 170, and thus reduces the amount of downwards force on bearing assembly 130. The reduced bearing loading is beneficial in that a smaller, lighter bearing may be used and/or bearing life may be increased over a bearing that must support the entire rotor weight.

Housing 110 includes a housing body 111 which surrounds rotor 120 and may, for example, be evacuated of air to reduce frictional losses from the spinning rotor. Housing 110 also includes components of magnet 170, including but not limited to an upper housing member 173 formed of or including a magnetic material and lifting winding 171. The magnetic material of upper housing member 173 may be, for example and without limitation, steel. In alternative embodiments, magnet 170 is located above rotor 120 and is separate from housing 110. Magnet 170 is thus arranged to provide a lifting force on rotor 120.

As discussed subsequently, various embodiments of housing 110 and/or magnet 170 may include, for example and without limitation, sensing elements to determine the state of the operation of magnet 170 and/or rotor 120.

Rotor 120 has a rotor body 121 that is formed from or includes a magnetic material, a lower shaft 123, and an upper shaft 125. In one embodiment, rotor 120, for example and without limitation, is formed from a magnetic material, such as steel and has a weight W of from 45 kg (100 lbs.) to 27,000 kg (60,000 lbs.).

Power components 150 include, but are not limited to a motor-generator comprising a rotor 151 attached to lower shaft 123 and a stator 153 attached to housing 111. Power components 150 are well known in the field and are used to convert electrical energy to rotational energy in rotor 120.

In general, bearing assemblies 130, 140 provide rotational support for rotor 120 within housing 110. Assemblies 130 and 140 illustrated in FIG. 1 are generic, and more specifically, as discussed subsequently, lower bearing assembly 130 includes a roller bearing that connects lower shaft 123 and housing 110, and upper bearing assembly 140 includes a roller bearing that connects upper shaft 125 and the housing. In addition, various embodiments of bearing assemblies 130 and/or 140 may include, for example and without limitation, springs that permit axial motion and forces on a bearing, a stop to limit the axial motion of a bearing, and/or a sensor for measuring an axial force or displacement on a bearing. The axial growth (or attenuation) of the rotor and small axial displacement of rotor 120 may be provided or mitigated by combinations of springs, stops, and magnets, to provide a range of $\delta$ of up to about 1 millimeter during the operation of flywheel assembly 100.

Figure 2B:
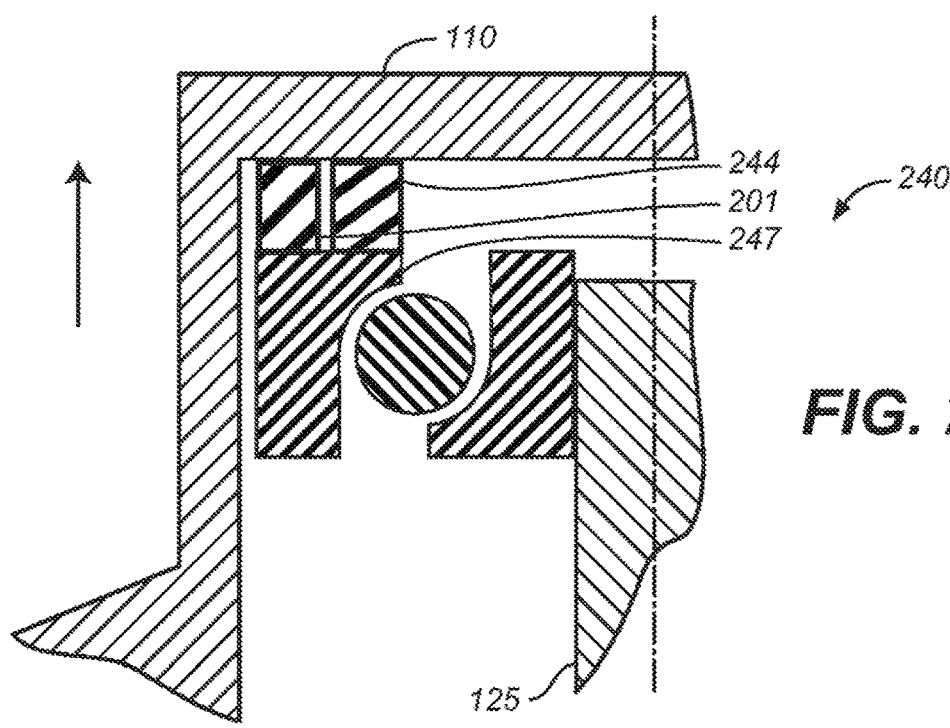

In general, the minimum requirement for the bearing assemblies 130, 140 is that they include at least one set of bearings and allow for some axial motion of rotor 120. FIGS. 2A and 2B are schematic cross-sectional views of a first embodiment upper bearing assembly 240, where FIG. 2A shows the rotor 120 in an extreme lower position and FIG. 2B shows the rotor in an extreme upper position. Upper bearing assembly 240 is generally similar to bearing assemblies 130 and 140, except as explicitly discussed below.

As shown in FIG. 2A, upper bearing assembly 240 supports upper shaft 125 in housing 110. More specifically, upper bearing assembly 240 includes bearings 241 which include a bearing inner portion 243, ball bearings 245, and a bearing outer portion 247. The inner portion of bearing 241 is connected to rotor 120 with, for example, bearing inner portion 243 being press-fit to upper shaft 125 and bearing outer portions 247 connected to housing 110. Upper bearing assembly 240 also includes an upper axial spring 244 that connects housing 110 and bearing outer portion 241, and a rigid piece indicated as a stop 201 that is connected to housing 110 and which limits the spring motion. Spring 244 may be, for example and without limitation, a wave or Bellville washer, and may be configured to provide a downwards force on rotor 120.

In the extreme lower rotor position of FIG. 2A, there is a gap of dimension δ between the bearing outer portion 247 and the stop residing in the housing 110. In the extreme upper rotor position of FIG. 2B, bearings 241 are forced upwards until bearing outer portion 241 contacts stop 201. Upper bearing assembly 240 thus allows rotor 120 to rotate and provides axial displacement limited by the size of stop 201.

Figure 3:
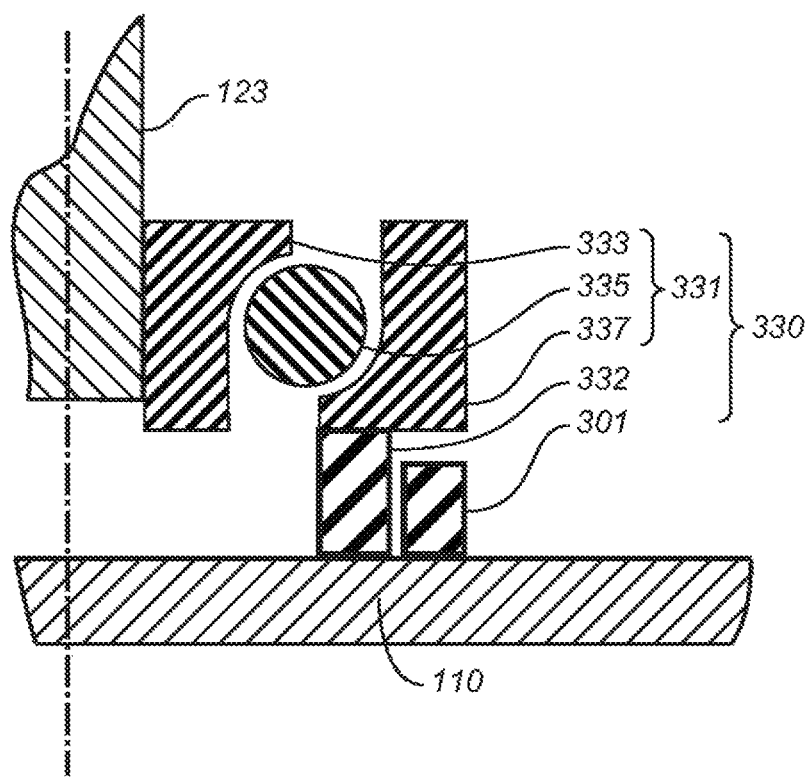
FIG. 3 is a schematic cross-sectional view of a first embodiment lower bearing assembly.

FIG. 3 is a schematic cross-sectional view of a first embodiment lower bearing assembly 330. Lower bearing assembly 330 is generally similar to bearing assemblies 130, 140, and 240, except as explicitly discussed below.

As shown in FIG. 3, lower bearing assembly 330 supports lower shaft 123 in housing 110. More specifically, lower bearing assembly 330 includes bearings 341 which include a bearing inner portion 333, ball bearings 335, and a bearing outer portion 337. The inner portion of bearing 331 is connected to rotor 120 with, for example, inner bearing portion 333 being press-fit to lower shaft 123 and bearing outer portion 337 connected to housing 110. Lower bearing assembly 330 also includes a lower axial spring 332 that connects housing 110 and bearing outer portion 331, and an optional rigid stop 301 that is connected to housing 110 and which limits the spring motion. Spring 332 may be, for example and without limitation, a wave or Bellville washer, and may be configured to provide an upwards force on rotor 120. Lower bearings 331 may be similar to upper bearings 341, or may be different in construction or load bearing capability.

The lifting force on rotor 120 by magnet 170 is determined by a gap g, which is the distance between the poles of the magnet and the rotor. It is apparent from FIG. 1 that gap g varies with the axial displacement δ, depending on rotor and magnet geometry. Thus, when the rotor moves to an extreme upwards position, g is a minimum, and when the rotor moves downwards by the distance δ, g is at a maximum distance. In addition, as the gap g changes, the forces on rotor 120 from movement of springs, such as from lower axial spring 332 and upper axial spring 244, may also change, depending on the spring design.

The outer portions of bearings 241 and 331 are mounted with a slip fit, with radial clearance of 2.5 μm (0.0001 inches) to 25 μm (0.001 inches). Axial play δ is only provided to allow for necessary differential length expansion of rotor relative to housing due, for example, to mismatched thermal conditions, or to Poisson effect induced rotor axial length variation due to centripetal loading.

This is nominally only needed at one end, the bottom, when magnet 170 is actuated. In one embodiment, slip fits are provided for both bearings 241 and 331 to be able to set the bearing forces with axial springs 244 and 332 when magnet 170 is either active (with bottom spring 331 and slip fit) or inactive (with top spring and slip fit).

Control system 160 may be used to provide a current I to lifting winding 171. Specifically, when current I is applied to lifting winding 171, the resulting magnetic field produces an attraction to magnetic materials in rotor body 121 that is counter to weight of the rotor body. Thus, for example, without any current in lifting windings 171 the combined bearing forces on bearing assemblies 130 and 140 is the weight of the rotor. With the application of a current to lifting windings 171, the combined bearing forces on bearing assemblies 130 and 140 is the rotor weight less the attractive force of rotor 120 to lifting windings 171.

The following simplified analysis provides some understanding of the forces involved in flywheel assembly 100 and in particular on bearing assemblies 130 and 140.

The forces on rotor 120 include the combination of the downward weight W of the rotor, a downward force fun exerted by upper bearing 241, an upwards force $f_{LB}$ exerted by lower bearing spring 332 and upwards lifting force induced by magnet 170, which may be written as F.

The forces on bearings 241 and 331 are thus a combination of W and F, and the forces imposed by axial springs 244 and 332 and any stops that are encountered by the movement of the bearings, such as stop 201 and/or stop 301. In general axial springs 244 and 332 may both be provided with a small amount of axial preloading, such as a minimal fraction (e.g. 0.001 to 0.10) of the rotor weight W. It is particularly important that rotor 120 does not contact any stationary parts. In addition, as discussed below, as rotor 120 approaches magnet 170, the attractive force increases under fixed magnet current, and some method is desirable to fix a minimum magnet-rotor spacing.

Since the lower bearing force is reduced by an increase in lifting force F, it is seen that the application of a lifting force may greatly decrease the forces on the bearings of lower bearing assembly 130. In certain embodiments, as discussed below, the force F is adjusted to balance, or nearly balance, the weight W, and the upper and lower bearing forces become nearly the same, and may have a value equal to the small amount of preloading noted above.

Figure 4:
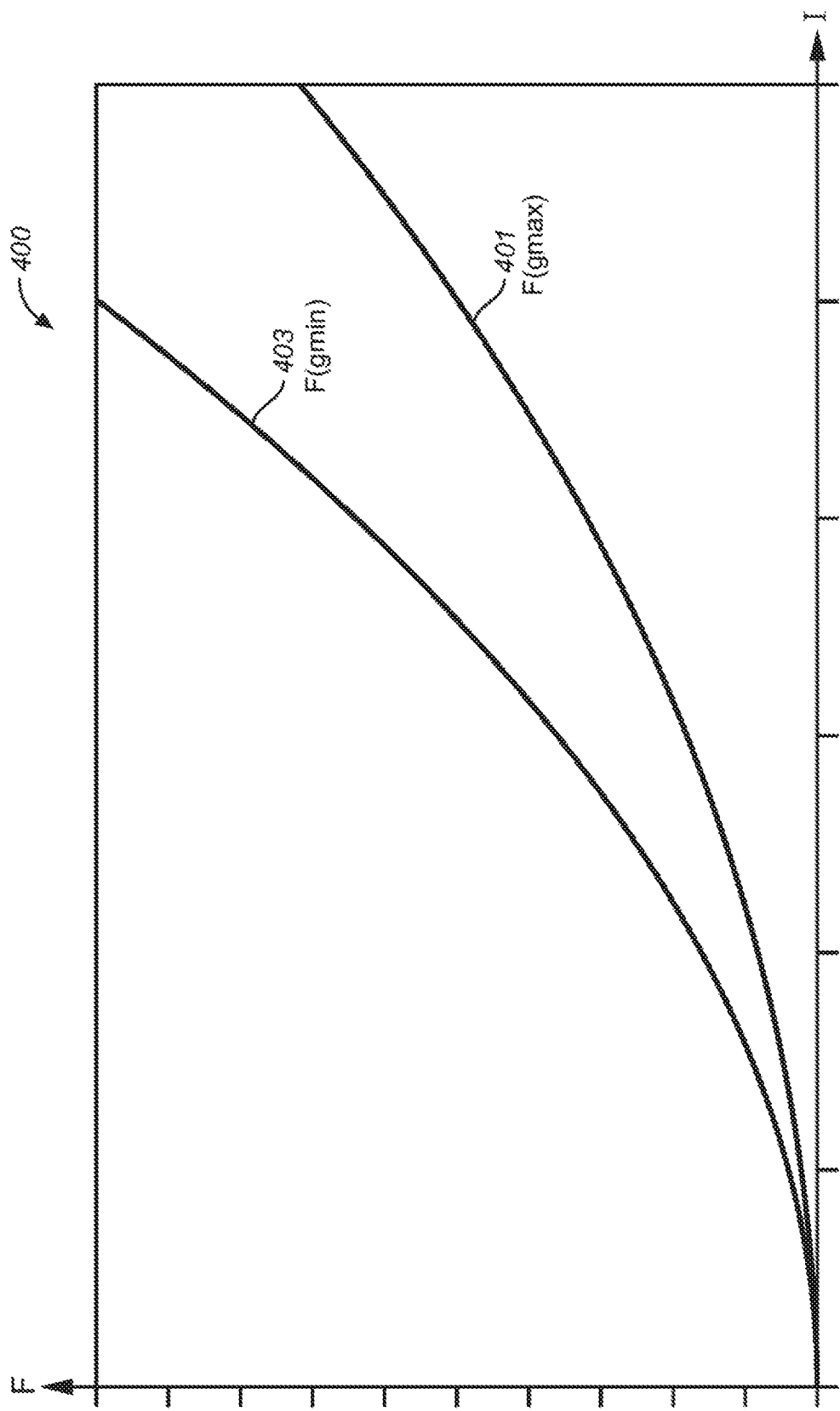
FIG. 4 is a graph showing the lifting force as a function of electromagnet current for two values of the gap, according to one embodiment.

A simplified analysis, based on use of high permeability linear magnetic materials, shows that the value of F increases with the square of the current I and inversely with the square of the gap g. Thus, for example and without limitation, an idealized model of electromagnet components of magnet 170 of FIG. 1 is shown in FIG. 4 as a graph 400 showing the lifting force, F, as a function of electromagnet current, I, for two values of the gap g. A first curve 401 is computed for a maximum value of g ($g=g_{max}$), that is, where rotor 120 is in an extreme lower position, as shown for example in FIG. 2A, and a second curve 403 is computed for a minimum value of g ($g=g_{min}$), that is where the rotor is in the extreme upper position, as shown for example in FIG. 2B. The lifting force F of magnet 170 on rotor 120 is approximated by $F=k(g)*I^2$, where the direction of F is upwards in FIG. 1, I is the current provided to lifting winding 171, and k(g) is a constant that depends on the gap g. More specifically, a decrease in g will increase k(g), that is, the attraction becomes greater as rotor 120 approaches electromagnet 170. With idealized magnetic material of infinite permeability, k(g) would exhibit an inverse-square dependence.

With no current (I=0), rotor 120 is at an extreme lower position, and the curve 401 provides the value of the lifting force F as a function of I. When the current is sufficient to lift the rotor to an extreme upper position, the value of the lifting force increases to that provided by curve 403. Rotor 120 thus has two stable mechanical positions depending on the current.

Figure 5:
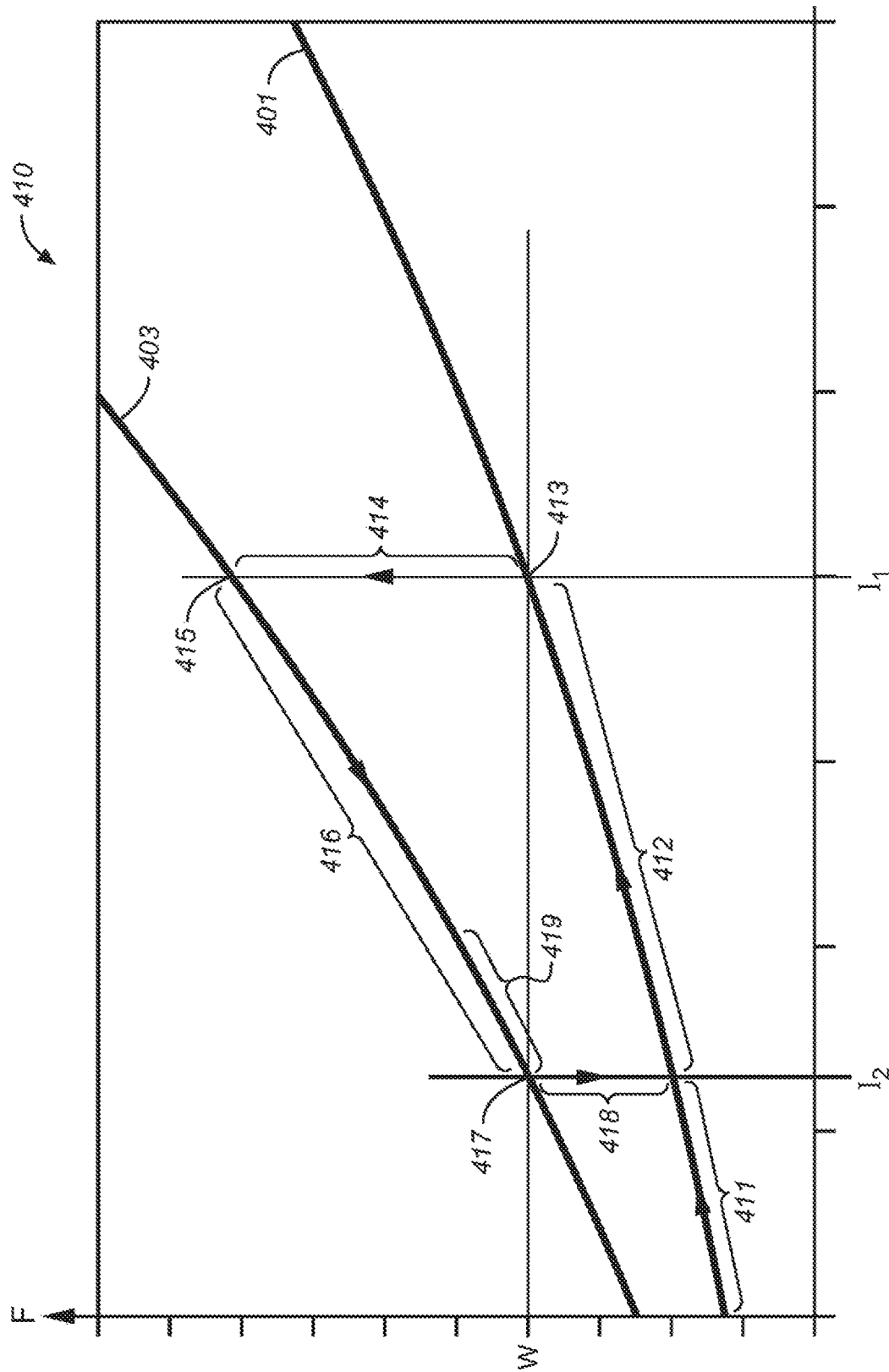
FIG. 5 is a graph showing the lifting force as the current is varied during operation of one embodiment of the flywheel apparatus.

One way of analyzing the dynamics of flywheel apparatus 100 is illustrated further in FIG. 5 as a graph 410 showing the lifting force F as the current I is varied during operation of the flywheel apparatus 100. Starting from rest, the gap is a maximum ($g=g_{max}$) and the application of current to magnet 170 increases lifting force F along curve 401, shown as curve portions 411 and 412. At some first, or upper critical current, indicated as $I_1$, lifting force F overcomes the weight W and other forces on rotor 120, such as spring preloading, as indicated by a point 413 of curve 401. At this point the axial position of rotor 120 is unstable and any slight increase in current or slight upwards axial motion of the rotor will cause the rotor to rise, decreasing g to a value of $g_{min}$, as indicated by curve portion 414 which terminates at a point 415 on curve 403. Note that at this smaller gap g, the lifting force F has increased to a value much greater that the weight W, forcing the rotor to the extreme upper position of FIG. 2A. The instability at the critical point is due to the large negative stiffness of the attractive magnet assembly.

With the rotor operating along curve 403, the current I may be decreased, as shown by curve portion 416. At some second, lower critical current, indicated by $I_2$, the lifting force again balances the forces on rotor 120, at a point 417 on curve 403, and the position of the rotor falls to a gap of $g_{min}$ and the operation of the rotor is along curve 401. The lifting force in now insufficient to levitate the rotor, and an increase in current moves back along portion 412 to point 413. The current force diagram thus demonstrates hysteresis with changes in current.

Certain embodiments operate the inventive flywheel assembly to reduce the load on the bearings, and specifically to a bearing in lower bearing assembly 130. The reduced operating load results in a reduced bearing size, and cost and increased lifetime.

In general, it is thus seen that the magnetic lifting force is thus accompanied by a substantial negative stiffness. When this lifting force roughly matches the rotor weight, and thus far exceeding the passive mechanical spring preloads, the accompanying negative stiffness also far exceeds the passive positive stiffness(es) of the preloading springs. As a consequence, the rotor will find a stable equilibrium in one of the two extreme axial positions. These positions correspond to either: 1) the lower bearing outer raceway residing in its extreme axial position in its seat (set by mechanical stop), or 2) the upper bearing outer raceway residing in its respective extreme axial position. This strategy of operation at an extreme axial position is desired because of the relatively high axial stiffness that results. Remaining axial compliance is due to the bearing axial stiffness, itself.

It is expected that that operation where the magnetic lifting force is large enough to guarantee that the upper bearing outer raceway is positioned against its stop is the preferred position, and design. This requires additional lifting force beyond that required to simply unload the bearings.

Positioning the rotor at its upper axial extreme position is strategic for two reasons: (i) the magnetic gap of the lifting structure is held at its minimum. This minimum (e.g. 1-3 mm) is set by manufacturing tolerances. The minimum gap results in minimum lifting current and power dissipation to achieve the specified lifting force; and (ii) the magnetic gap remains invariant over operating conditions as differential expansions between rotor and housing occur. These differential expansions are taken up at the bottom bearing seat.

Thus, lifting power dissipation for equilibrium is held to its practical minimum, the magnet current to affect this lifting force is nearly invariant during operation.

In certain embodiments, it is preferable to operate flywheel apparatus 100 such that lifting force F closely and stably balances the weight W. Curve portion 419 illustrates a stable operating range of flywheel apparatus 100 with a gap value of $g_{min}$ such that the rotor 120 is closer to magnet 170, and the lifting force closely matches the weight of the rotor. Specifically, at such conditions, the rotor weight is lifted, with magnet 170 supporting the weight of the rotor, and the axial force on the bearing of bearing assembly 130 is on the order of the amount of preloading of any spring in the bearing assembly 130, which can be a small fraction of the weight of the rotors, such as in the range of 1% of bearing rated dynamic load capacity.

With rotor 120 thus lifted, the load on lower bearing 331 is set precisely by axial spring 332, and the load on upper bearing 241 is set by difference of magnetic force and rotor weight. Under some conditions, the difference between the magnetic force and rotor weight will equal the spring force in upper assembly. Under other conditions, specifically where the negative magnet stiffness exceeds the positive spring stiffness, upper bearing 241 will contact stop 210, and the load on upper bearing 241 will be in excess of the preloading of spring 244. The reduced operating load on the bearing results in a reduced bearing size and cost and increased lifetime.

In one embodiment, control system 160 cycles the current between $I_1$ and $I_2$, and then provides a current slightly higher current than I2, on curve portion 419. In another embodiment, the control system 160 provides open loop control by determining currents $I_1$ and $I_2$ before operation of flywheel system 100 and storing the values in a look-up table, and the flywheel is then operated by increasing the current to $I_1$, and then decreasing the current to a value slightly above the value $I_2$ to operate on curve portion 419.

In general, it may be difficult to set current (or to specify magnet strength) in an off-loading magnet device with a simple open-loop set point. This difficulty arises from the lifting magnet parametric uncertainties. Uncertainties arise from geometric variation in the magnetic gap and area, occurring in both manufacture (tolerance) and operation. Parametric variations in operation occur with magnetic gap variation in response to: (i) differential thermal expansion between rotor and housing, and (ii) to applied magnetic lifting force. Specifically, magnetic lifting force may directly affect the equilibrium position of the rotor against a passive axial spring loading element.

The following discussion describes two embodiments for more directly controlling the lifting of rotor 120 by using sensors and feedback control. The first utilizes mechanical sensors or measurements to determine the position of or forces on rotor 120. The second utilizes electrical (non-mechanical) sensors or measurements to determine the magnetic flux and thus determine the operating condition of the flywheel apparatus 100.

Mechanical Sensing and Method of Operation

Certain embodiments include sensor and/or measurements of rotor displacement. In certain embodiments, control system 160 may receive input from sensors of flywheel assembly 100 which may be used to regulate the current I through feedback control to operate rotor 120 at an extreme upper position with a current that is as close to the minimum current $I_2$ as is practically possible.

Figure 6:
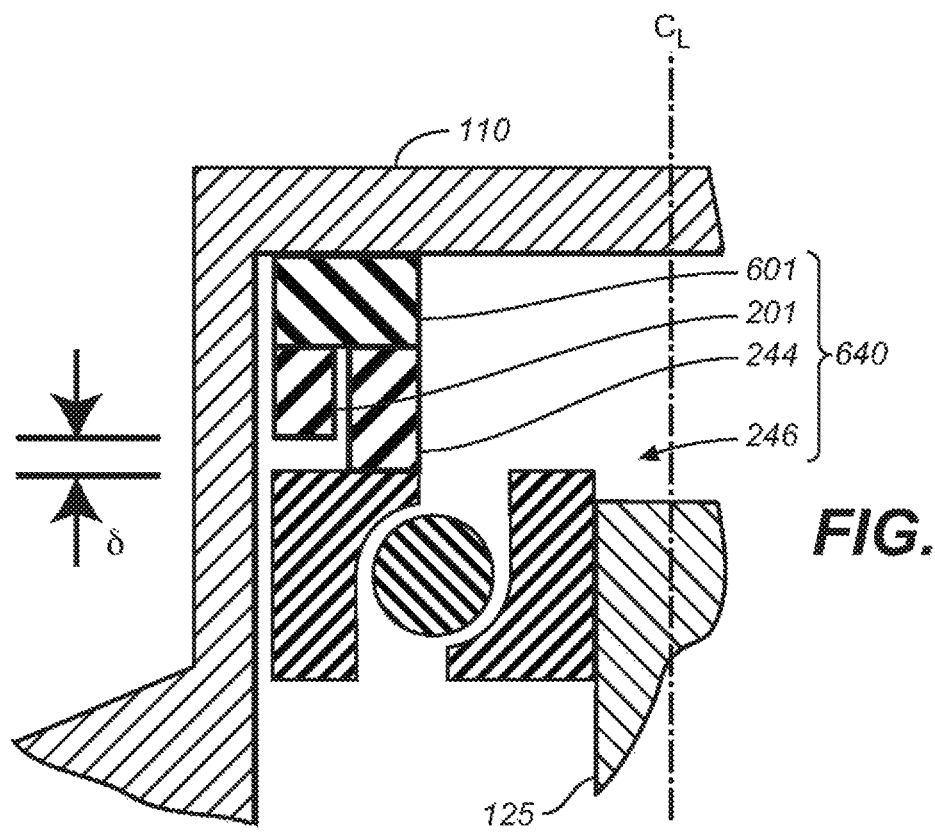
FIG. 6 is a schematic cross-sectional view of a second embodiment upper bearing assembly.
Figure 7:
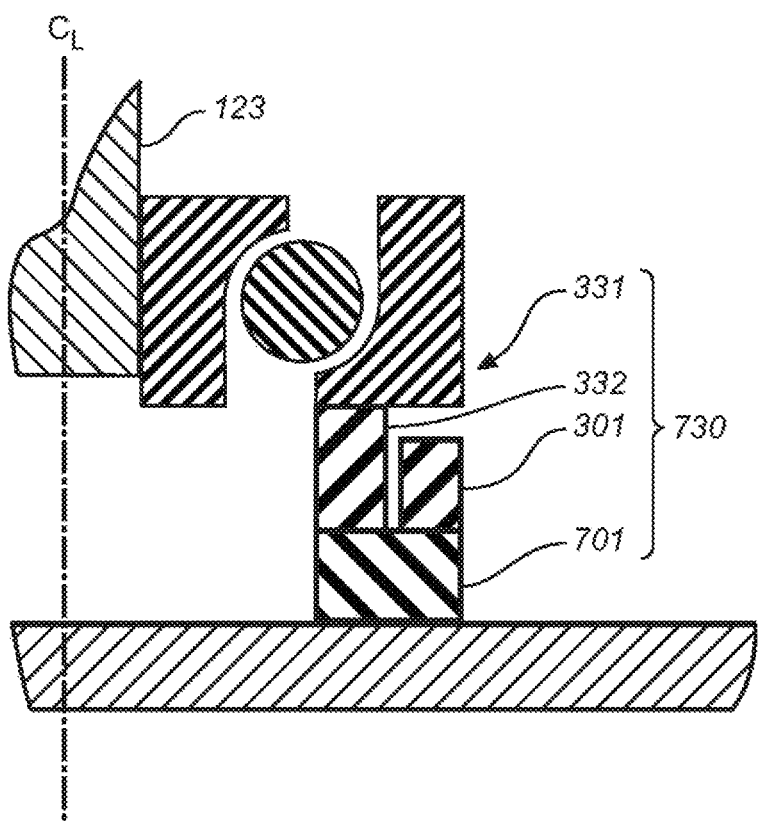
FIG. 7 is a schematic cross-sectional view of a second embodiment lower bearing assembly.

As an example of using mechanical sensing to control flywheel assembly 100, one or more force sensors may be provided to flywheel assembly to measure forces and provide an output to control system 160. Thus, for example, FIG. 6 is a schematic cross-sectional view of a second embodiment upper bearing assembly 730 and FIG. 7 is a schematic cross-sectional view of a second embodiment lower bearing assembly 730. Bearing assemblies 640 and 730 are generally similar to the other bearing assemblies 130, 140, 240, 330, described herein, except as explicitly discussed subsequently.

As shown in FIG. 6, upper bearing assembly 640 includes the components of upper bearing assembly 240 and a force sensor, referred to herein as strain gauge 601. Strain gauge 601 is attached to housing 110, and stop 201 and axial spring 244 are both attached to the strain gauge. The operation of upper bearing assembly 640 is thus generally similar to that of bearing assembly 240, and uses strain gauge 601 to measure the forces transmitted from rotor 120 to the upper bearing assembly and provide the measurement to control system 160.

As shown in FIG. 7, lower bearing assembly 730 includes the components of lower bearing assembly 330 and a force sensor, referred to herein as strain gauge 701. Strain gauge 701 is attached to housing 110, and stop 301 and axial spring 332 are both attached to the strain gauge. The operation of lower bearing assembly 640 is thus generally similar to that of bearing assembly 330, and uses strain gauge 701 to measure the forces transmitted from rotor 120 to the lower bearing assembly and provide the measurement to control system 160.

In one embodiment, control system 160 accepts and uses the signal of upper strain gauge 601 as an indication of the axial load on upper bearing 241. Strain gauge 601 may then be used in a low bandwidth control loop, via conventional signal feedback or for calibration, to accurately set a preload on upper bearing 201. The axial preload of lower bearing 331 is set by lower axial spring 332.

In another embodiment, force F is used to hold rotor 120 against stop 201, and only one strain gauge measurement is needed in the upper bearing, as for example by strain gauge 601, while no strain gauge is provide on lower bearing assembly 130. The axial load on lower bearing 331 is set by the preload spring in the bottom bearing mount.

Figure 8:
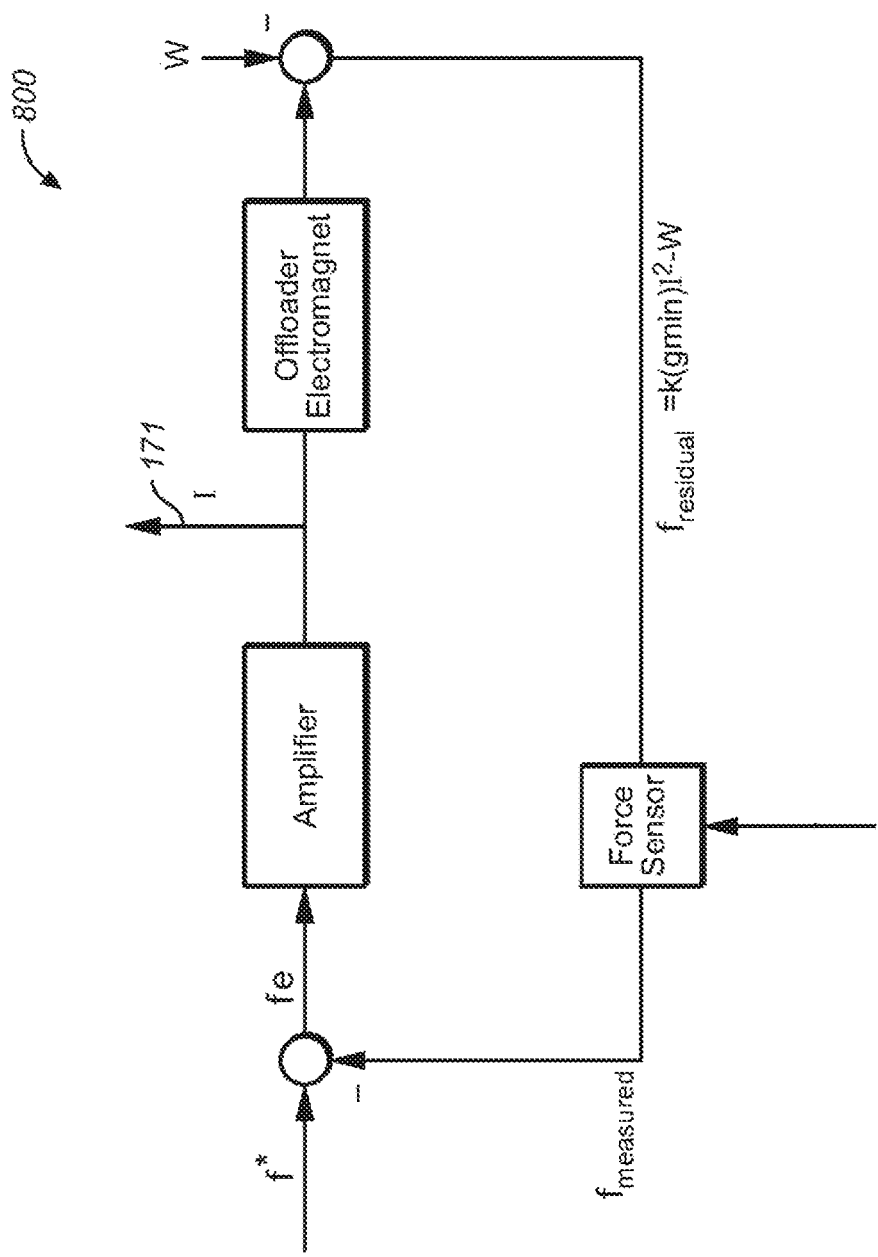
FIG. 8 is a control system diagram illustrating one embodiment of a control algorithm of the present invention.

FIG. 8 is a control system diagram illustrating one embodiment of a control algorithm 800 of the present invention that may be implemented as an analog or digital control system 160. In general, control algorithm 800 accepts a measure of the force on upper bearing 241 as sensed, for example, a force sensor which may be, for example, strain gauge 601, and provides a current I to lifting winding 171 to operate flywheel apparatus on the curve portion 419 of FIG. 5.

Algorithm 800 has a stored reference value f* that is indicative of the desired axial force on upper bearing 231 and calculates a residual force, which may be written as $f_{residual}=k(g_{min})*I^2-W$. The residual force is sensed by strain gauge 601, which produces an output analog signal $f_{measured}$. Algorithm 800 subtracts $f_{measured}$ from f*, to produce error signal $f_e$, which is then amplified to produce the desired amount of current I to lifting winding 171.

Non-Mechanical Sensing and Method of Operation

Figure 9:
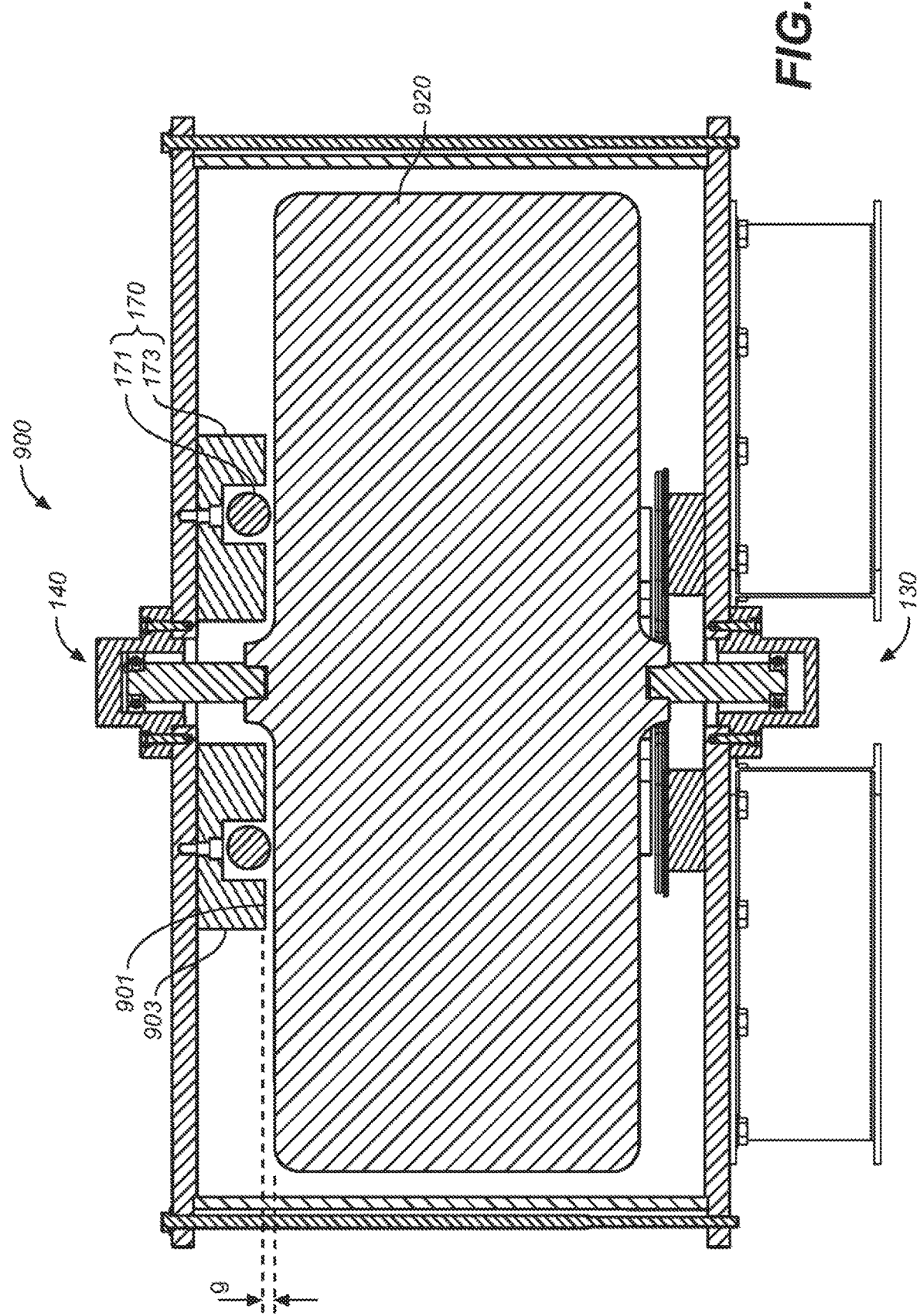
FIG. 9 is a schematic cross-sectional view of a second embodiment flywheel apparatus of the present invention.

The following discussion provides alternative embodiments for control of flywheel assembly 100 based on measurements related to the magnetic flux the produces force F. FIG. 9 is a schematic cross-sectional view of a second embodiment flywheel apparatus 900. Flywheel apparatus 900 is generally similar to flywheel apparatus 100, except as explicitly discussed subsequently.

Flywheel apparatus include a rotor 920 that is more cylindrically shaped than rotor 120, but is otherwise generally similar. Rotor 920 may be used in any of the previous embodiments, which may be for example and without limitation the embodiments of any one of FIG. 1, 2, 3, 6 or 7. Alternatively, the non-mechanical sensing and method of operation of this section may be incorporated into rotor 120, or rotors of other, different geometries.

Flywheel apparatus is also provided with one or more gap magnetic field sensing elements. FIG. 9 shows the placement of a first Hall sensor 901 which is located directly in the gap between rotor 920 and electromagnet 170 and measures the field within the gap, and a second Hall sensor 903 which is located on an outer edge of the electromagnet lifting pole and which senses the fringing field, which is directly proportional to the direct gap field.

Figure 10:
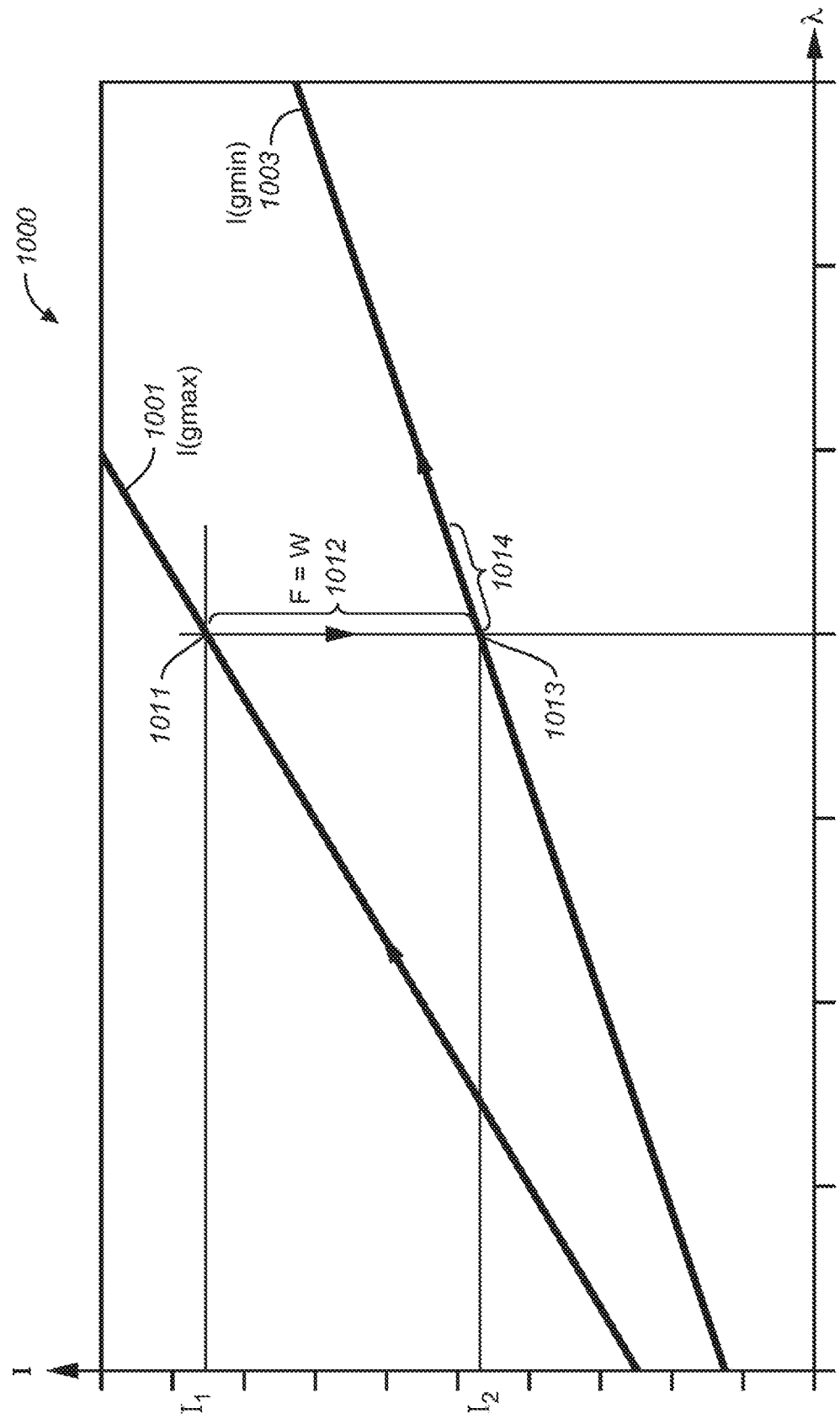
FIG. 10 is a graph showing the current as a function of the flux linkage for two values of the gap, according to one embodiment.

The magnetic lifting force F may be described as $F=k_B\lambda^2$, where $\lambda$ is the winding flux linkage, and $k_B$ is essentially independent of magnetic gap g. The winding flux linkage is defined as the integral of the magnetic flux density normally crossing the gap, multiplied by the number of winding terms. Use of measured gap flux, or alternatively a signal that is physically proportional to the gap flux, provides a measurement signal for precise and accurate control of the magnetic unloading force. FIG. 10 is a graph 1000 showing the current I as a function of flux linkage $\lambda$ for the electromagnet for two values of the gap-curve 1001 shows the current for the maximum gap $g_{max}$, and curve 1003 shows the current for the minimum gap $g_{min}$.

As flux is increased from zero, the current I increases proportionally according to the reciprocal winding inductance with largest gap dimension $g_{max}$ along curve 1001. This is the smallest value of winding inductance. As flux increases, the magnetic force rises until it balances the rotor weight. At this critical value of $I=I_1$ which is indicated as point 1011, and which is discussed above with reference to FIG. 5, the rotor rises, as indicated by a curve portion 1014, resulting in new magnetic gap $g_{min}$, and a corresponding maximum winding inductance. The winding current I reduces from $I=I_1$ to $I=I_2$ since the flux cannot change instantaneously. Subsequent increases in flux follow curve 1003, corresponding to maximum inductance, and minimal winding current. This region, and especially a portion 1014 near point 1013, defines the preferred efficient region of operation. Reference values of flux and of winding current can be derived from observation of this transition.

The electrical parameter that delineates the two curves in FIGS. 4 and 10 is the offloader winding inductance. Thus the transition values of current $I_1$ and $I_2$, and of flux $\lambda$, are reflected in the instantaneous winding inductance value. The instantaneous winding inductance value can be determined by computing the static ratio of flux lambda to winding current. Alternatively, the instantaneous winding inductance value can be determined by injecting a small amplitude ripple signal into the winding, and resolving the ratio of the ripple flux to the ripple current. The ratio of ripple flux to ripple current is also defined by the winding inductance.

Figure 11:
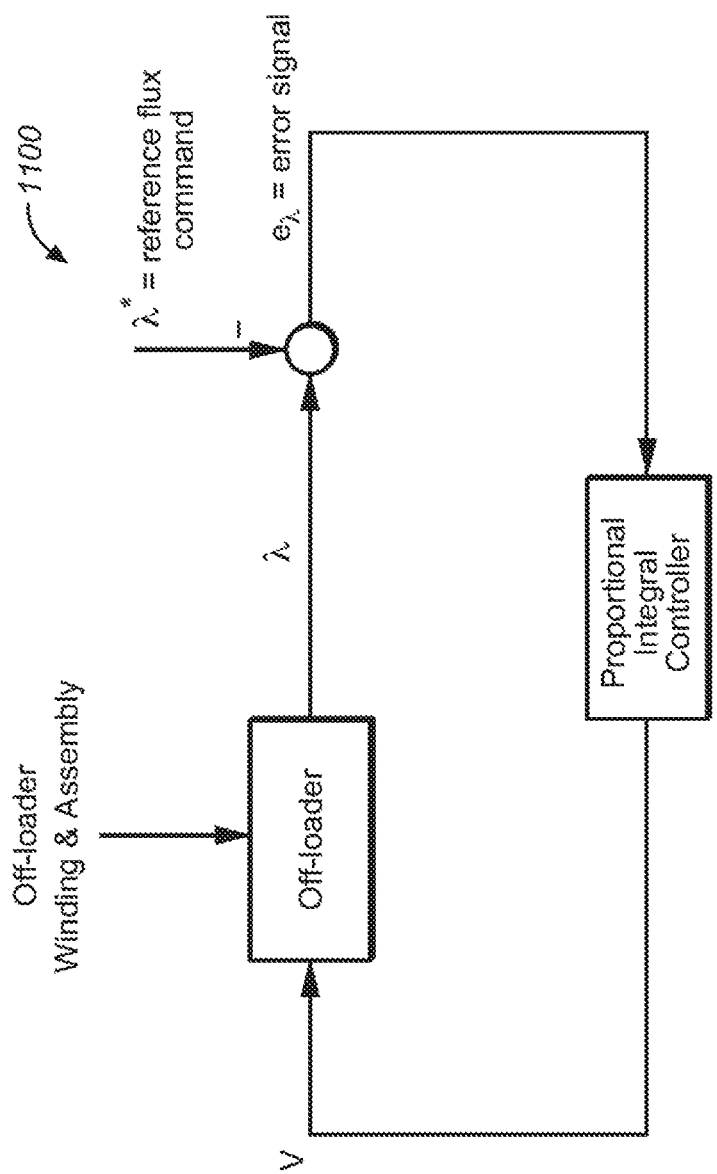
FIG. 11 is a control system diagram illustrating a second embodiment of a control algorithm of the present invention.

The derived reference value of current $I_2$ may be used directly by control system 160 to drive current I, providing the desired unloading force. Or, an alternative controller based on magnetic flux may be used to accurately control force as illustrated in control system diagram of FIG. 11, which shows a second embodiment of a control algorithm 1100.

Control algorithm 1100 illustrates the use of winding voltage 171 as input to control system 160, adjusting the voltage up when flux is below the reference value, and vice versa. This control can be conveniently implemented with either an analog or digital proportional-integral (P-I) controller. The current I may be measured for use in overcurrent protection circuitry, and may also be used as an auxiliary variable for use in the controller. However, direct control of current as an input, or as an output is not needed, since magnetic flux is used as the principle physical control variable.

Alternative Magnet Embodiments

In alternative embodiments, any of the flywheel apparatus described above may have a magnet 170 that is a hybrid magnet including both an electromagnet and a permanent magnet.

Figure 12:
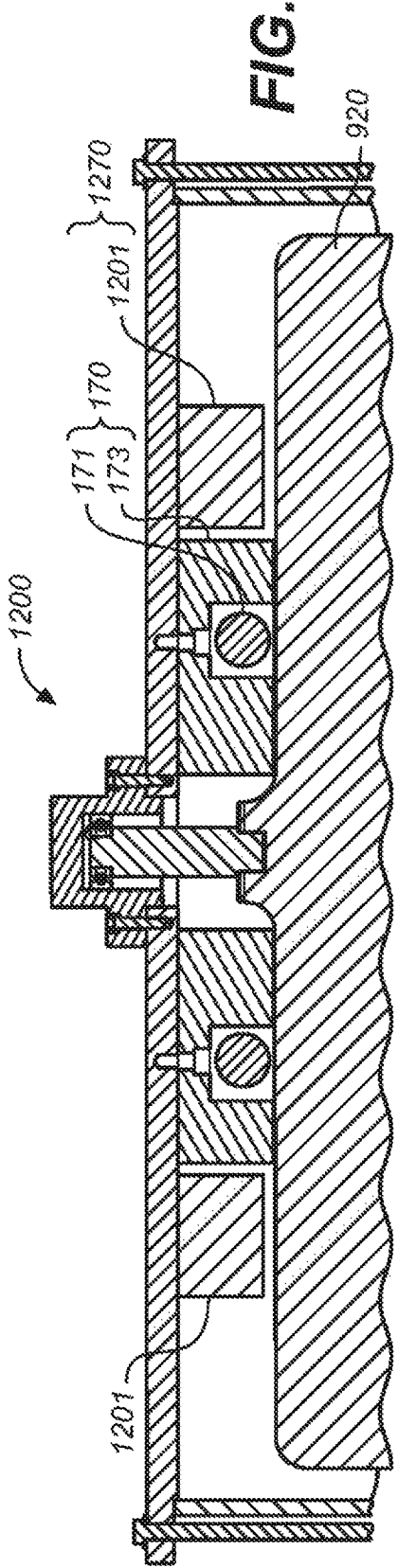
FIG. 12 is a schematic cross-sectional view of a flywheel apparatus of the present invention having a second embodiment magnet.

FIG. 12 is a schematic cross-sectional view of a flywheel apparatus 1200 of the present invention having a second embodiment magnet 1270. Flywheel apparatus 1200 is generally similar to any of the flywheel apparatus described above. Magnet 1270 includes magnet 170, which is an electromagnet, and a permanent magnet 1201. In this embodiment, magnet 1201 is an axially magnetized ring magnet, and may be one magnet, or could be several smaller arc magnets. Magnets 170 and 1201 are arranged to have shared flux paths.

In flywheel apparatus 1200, rotor 920 is lifted by the combination of magnets 170 and 1201. This combination reduces the amount of lifting current required by magnet 170, and thus the windings of the electromagnet of magnet 770 may be proportionally smaller than those of flywheel apparatus 100, and/or the winding power requirements may be reduced.

Figure 13:
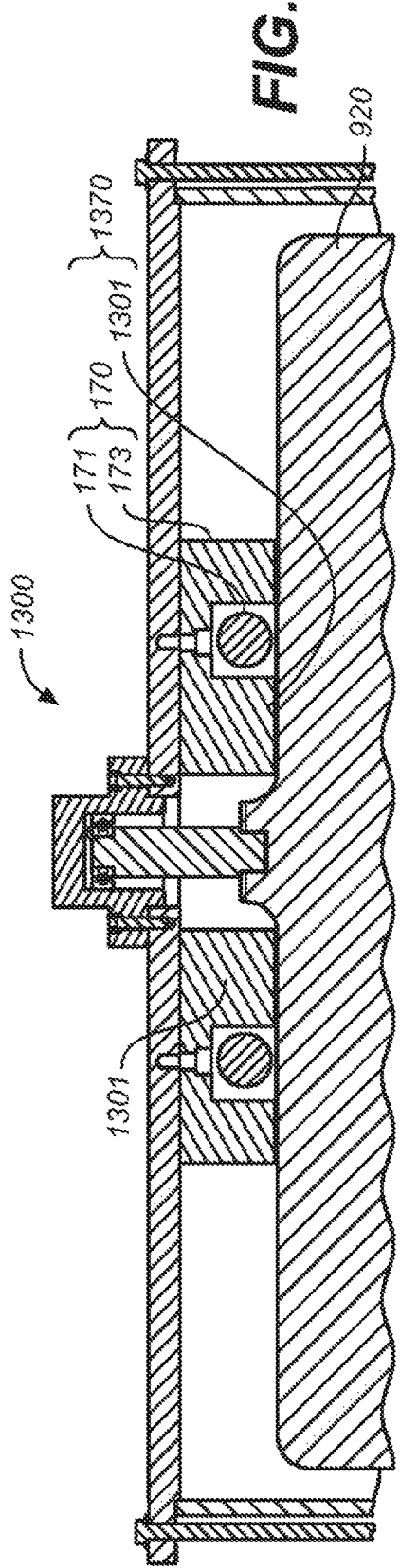
FIG. 13 is a schematic cross-sectional view of a flywheel apparatus of the present invention having a third embodiment magnet.

FIG. 13 is a schematic cross-sectional view of a flywheel apparatus 1300 of the present invention having a third embodiment magnet 1370. Flywheel apparatus 1300 is generally similar to any of the flywheel apparatus described above. Magnet 1370 includes magnet 170, which is an electromagnet, and a permanent magnet 1301. In this embodiment, magnet 1301 is an axially magnetized, axi-symmetric ring magnet that is configured to be in series with the flux path of magnet 170.

As in flywheel apparatus 1200, rotor 920 of flywheel apparatus 1300 is lifted by the combination of and electro-magnet and permanent magnet, and thus the windings of the electromagnet of magnet 1370 may be proportionally smaller than those of flywheel apparatus 100.

Flipped-Bearing Embodiments

Figure 14:
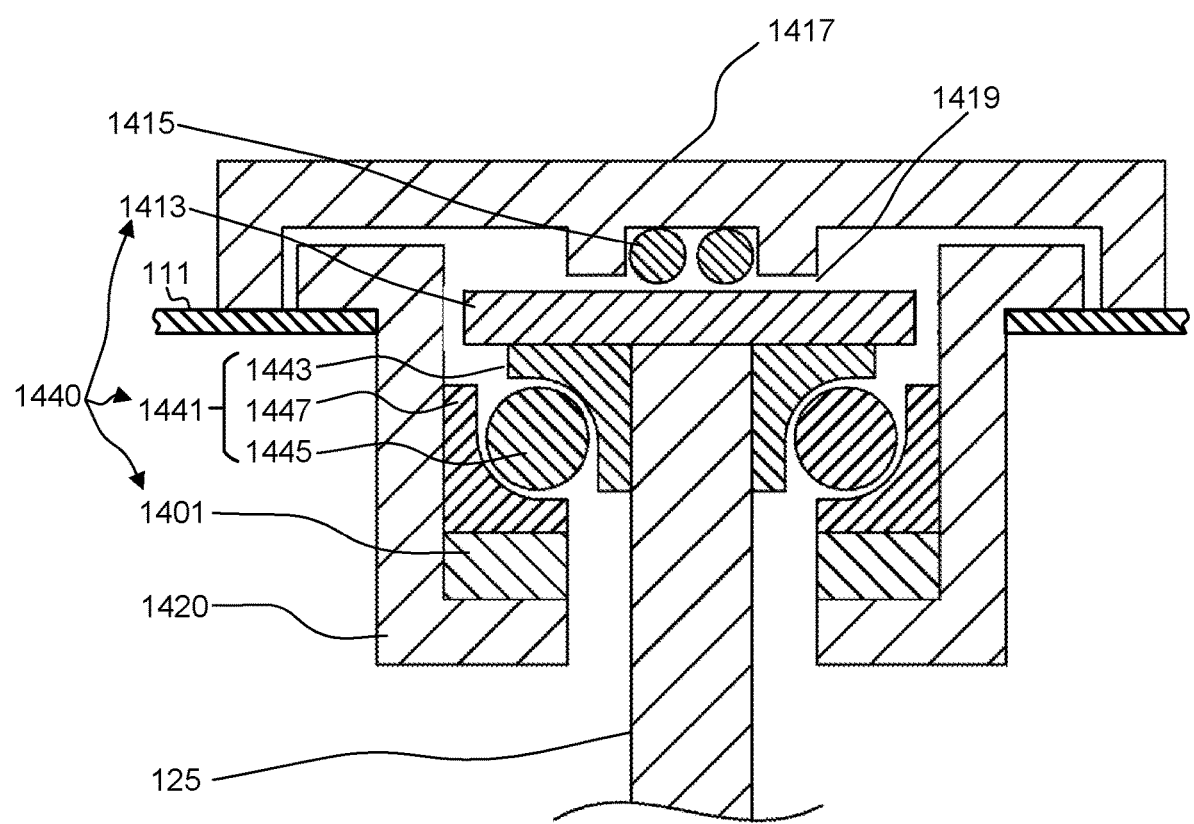
FIG. 14 is a schematic cross-sectional view of a third embodiment of an upper bearing assembly.
Figure 15:
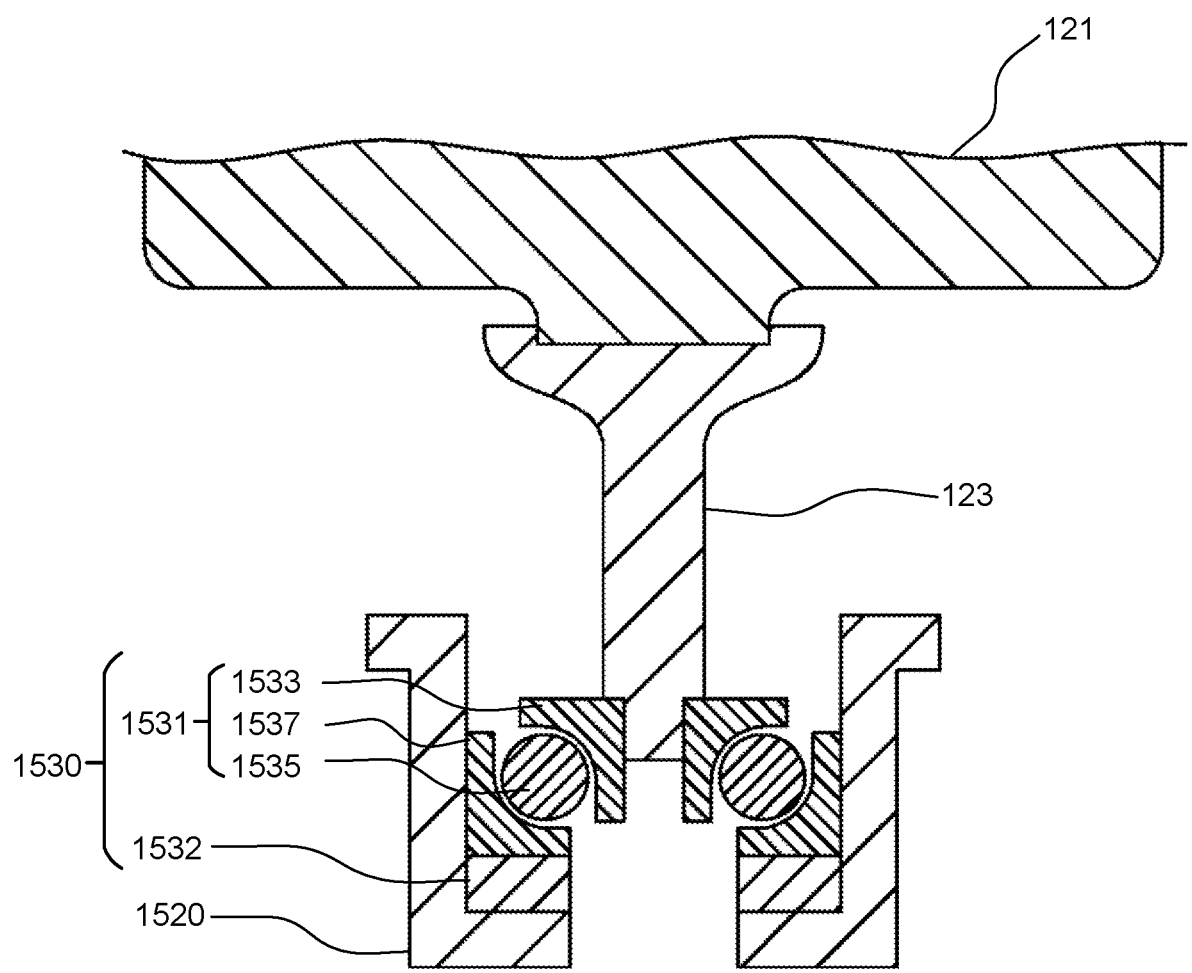
FIG. 15 is a schematic cross-sectional view of a third embodiment of a lower bearing assembly.

FIG. 14 is a schematic cross-sectional view of a third embodiment of an upper bearing assembly 1440, referred to as a flipped-bearing embodiment, and FIG. 15 is a schematic cross-sectional view of a third embodiment of a lower bearing assembly 1540. Bearing assemblies 1440 and 1540 are generally similar to the other bearing assemblies 130, 140, 240, 330, 640 and 730, described herein, except as explicitly discussed subsequently.

In this embodiment, rotor 120 does not travel axially during flywheel operation; magnet 170 is used to regulate the amount of force rotor 120 exerts against upper bearing assembly 1440 rather than the axial motion of the rotor along a shaft. Further, upper bearing assembly 1440 supports a downward net force, rather than an upward net lifting force. The downward net force is the difference between the rotor gravitational load (i.e., the rotor weight) and the upward lifting magnetic force applied by magnet 170. In this embodiment, the preferred operation has the rotor gravitational load slightly exceeding the upward magnetic lifting force.

In the embodiment shown in FIG. 14, upper bearing assembly 1440 supports upper shaft 125 which in turn connects to rotor body 121. Upper bearing assembly 1440 includes an upper bearing 1441, a bearing locking cap 1413, and a force sensor 1401. Bearing 1441 includes a bearing inner portion 1443, ball bearings 1445, and a bearing outer portion 1447. The inner portion of bearing 1441 is connected via upper shaft 125 to rotor body 121. Bearing inner portion 1443 may, for example, be press-fit to upper shaft 125. Bearing outer portion 1447 connects to an upper bearing housing 1420 which in turn connects rigidly to housing body 111.

In contrast to upper bearing assemblies 240 and 640, neither an axial spring nor a stop is required; rather bearing housing 1420 acts as a stop. Force sensor 1401 is mounted between a lower portion of bearing housing 1420 and the bottom of bearing outer portion 1447. Force sensor 1401 enables use of a closed-loop force control approach described hereinbelow with reference to FIG. 16.

Bearing locking cap 1413 fits and holds upper bearing 1441 onto shaft 125. It may be appreciated that shaft 125 may be a stub shaft. In certain embodiments, bearing locking cap 1413 fastens directly to either inner portion 1443 or shaft 125. In such embodiments, bearing locking cap rotates along with inner portion 1443 and shaft 125.

Upper bearing housing 1420 acts as a lower stop to limit downward axial motion by bearing 1441. In certain embodiments, upper bearing housing 1420 is part of housing body 111; in other embodiments, bearing housing 1420 is a separate part that connects rigidly to housing body 111. In flipped bearing embodiments, upper bearing housing 1420 supports upper bearing assembly 1440 from below.

Upper bearing outer portion 1447 uses a slip fit so that the load on upper bearing 1441 is supported through force sensor 1401 to permit accurate measurement of the upper bearing load.

As previously discussed, rotor 120 doesn't move axially during normal operation; neither does it move axially during start-up or shut-down. To protect against an unusual upward vertical displacement, a backup thrust bearing 1415 may be included. Such an unusual upward vertical displacement may occur, for example, due to an accident during transportation or as a result of a seismic event. Backup thrust bearing 1415 is additionally useful in the case that angular contact bearings are used for bearing 1441, as explained in further detail below.

Backup thrust bearing 1415 is situated between bearing locking cap 1413 and a cap 1417, which locks to housing body 111. In normal operation there is a gap 1419, of distance β (beta), between the top of bearing locking cap 1413 and the bottom of backup thrust bearing 1415. This distance, β (beta), is then the total axial distance that upper bearing 1441 can travel without engaging backup thrust bearing 1415. If this distance is exceeded in the vertical direction then bearing locking cap 1413 will engage with backup thrust bearing 1415. Backup thrust bearing 1415 is referred to as a backup bearing since in normal operation it does not spin, i.e. it is not in contact with bearing locking cap 1413. Backup thrust bearing 1415 is configured to absorb or diffuse upwards vertical thrust from shaft 125 that might otherwise result in damage or containment issues by accommodating upwards thrust without frictionally restraining rotation. While during transportation the rotor is not rotating, if a seismic event or other event occurs during operation of the flywheel then rotor 120 will most likely be spinning. In this case, a backup bearing rather than simply a bushing material is advantageous to absorb or diffuse the large rotational energy of the rotor.

It may be appreciated that while backup thrust bearing 1415 is illustrated to indicate the use of ball bearings, other types of bearings, including inter alia, a lubricated plate may be used. It may further be appreciated that in certain embodiments there is no cap 1417, in which case flywheel housing 110 provides the top of bearing assembly 1440.

In contrast to upper bearing assemblies 240 and 640, upper bearing assembly 1440 doesn't require either an axial spring or a stop; rather bearing housing 1420 acts as a stop. Force sensor 1401 mounts between a lower portion of bearing housing 1420 and the bottom of bearing outer portion 1447. This enables use of the closed-loop force control approach described with reference to FIG. 16, described hereinbelow.

In the embodiment shown in FIG. 15, a lower bearing assembly 1530 supports lower shaft 123 which in turn connects to rotor body 121. As illustrated, lower shaft 123 may be a stub shaft which connects to a journal of rotor body 121. However, in other embodiments lower shaft 123 may take different forms and the connection between lower shaft 123 and rotor body 121 may take different forms without departing from the scope and spirit of the subject invention.

Lower bearing assembly 1530 includes lower bearing 1531, and a spring 1532. Spring 1532 is disposed between lower bearing 1532 and a lower bearing housing 1520. Bearings 1531 include a bearing inner portion 1533, ball bearings 153, and a bearing outer portion 1537. Bearing inner portion 1533 connects via lower shaft 123 to rotor body 121. Bearing outer portion 1537 connects to a bearing housing 1520. Bearing inner portion 1533 may be, for example, press-fit to lower shaft 123.

In certain embodiments, lower bearing housing 1520 is part of housing body 111; in other embodiments, lower bearing housing 1520 is a separate part that connects rigidly to housing body 111. In flipped bearing embodiments, lower bearing housing 1520 supports lower bearing assembly 1530 from below.

Lower bearing outer portion 1537 uses a slip fit to travel axially along lower bearing housing 1520 to accommodate differential length adjustment between the rotor together with lower shaft 123, and housing 111 due to temperature swing and due to motion induced axial growth of the rotor. Spring 1532 is set to a prescribed bearing preload to allow for such travel.

A variety of embodiments may implement the flipped-bearing design. In certain embodiments, upper bearing 1441 as well as lower bearing 1531 employ angular contact ball bearings that provide high thrust capacity in one direction. Typically, angular contact ball bearings have raceways in the inner and outer rings that are displaced relative to each other in the direction of the bearing axis. This means that they are designed to accommodate simultaneous radial and axial loads. In such embodiments, upper bearing 1441 and the bottom bearing 1531 are mounted so as to provide high thrust capacity in the downward direction to support the rotor against downward gravitational force.

Flywheel embodiments that incorporate the flipped-bearing design offer a number of advantages relative to the previous bearing assembly embodiments described with reference to FIGS. 2A-2B, 3, 6 and 7. The use of spring 1532 supporting the lower bearing allows for differential rotor and housing axial dimension growth to be accommodated at the lower bearing housing. As such, the dimension of the magnetic gap, g, is nearly invariant under differential dimensional changes between housing and rotor. Loading on upper bearing 1441 is set and controlled by magnetic offloading control system 160 while loading on lower bearing 1531 can be fully controlled by an axial preload spring. Thus, it is straightforward to ensure that the lower bearing will have excellent fatigue life under all operating conditions. As a result, any service to bearing assemblies 1440, 1530, such as replacement or repair, will typically only involve upper bearing assembly 1440, which can be accessed from the top without having to disconnect and remove flywheel rotor 120. This can substantially reduce service and repair costs.

The flipped-bearing design also reduces the required offloader lifting force. For example, if, offloader magnet 170 had to apply rotor weight +1000 lb, to top bearing assembly 1440, then, using the flipped-bearing design it applies rotor weight −1000 lb. This makes control of the electromagnet in offloader magnet 170 easier and potentially reduces its power consumption and size.

Furthermore, damage to the bearings due to unusual movements will be more likely to impact or damage the relatively cheaper, easier to replace backup bearing 1415 rather than the relatively more expensive main bearings, i.e. top bearing 1440 and bottom bearing 1540.

Figure 16:
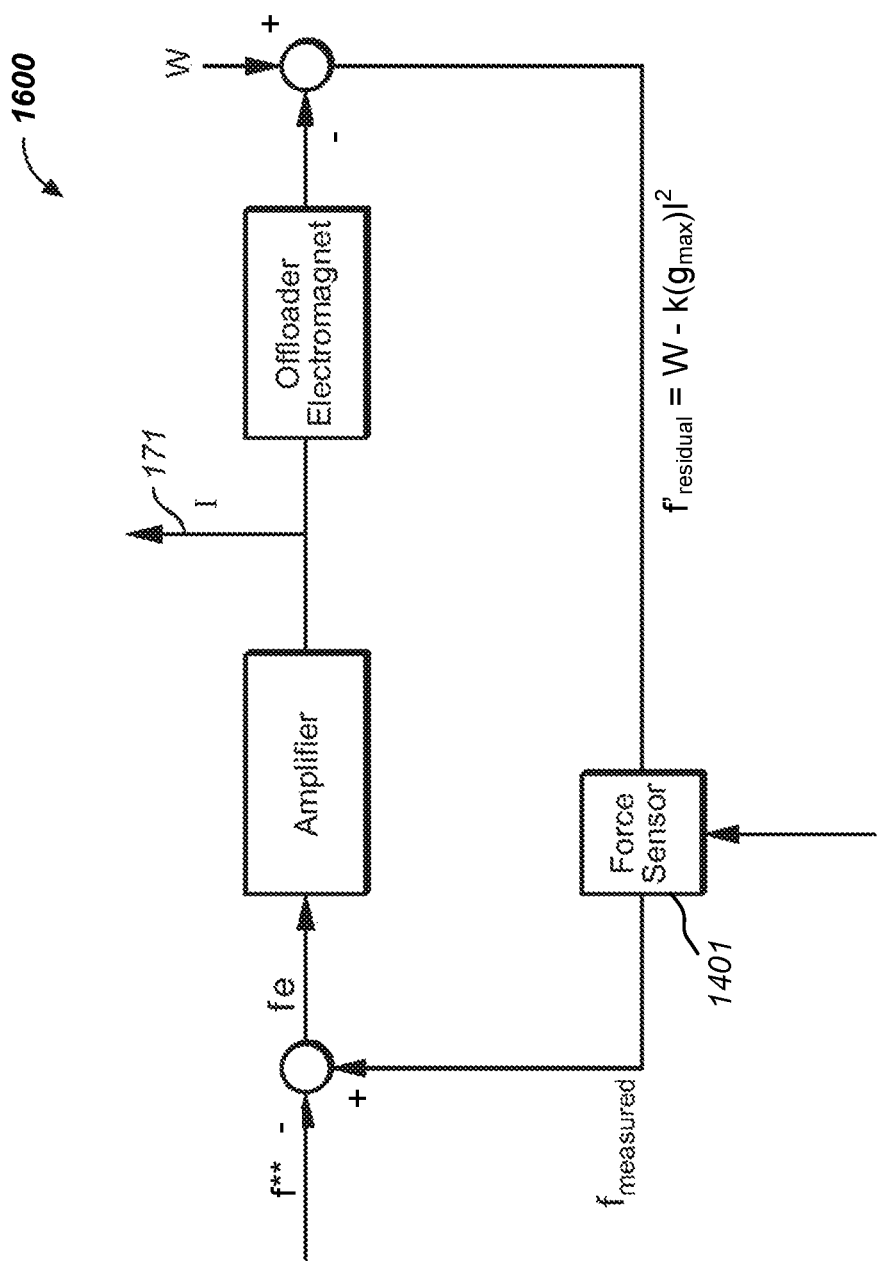
FIG. 16 is a control system diagram illustrating a third embodiment of a control algorithm of the present invention.

FIG. 16 is a control system diagram illustrating a third embodiment of a control algorithm 1600 of the present invention. Control algorithm 1600 is a version of control algorithm 800 that is adapted for use with the flipped-bearing embodiments described with reference to FIGS. 14-15. As such, it is identical to control algorithm 800 with the exception that the force sensing element 1401 has reversed polarity; thus the polarity of control algorithm 1600 is reversed from that of control algorithm 800.

Control algorithm 1600 may be implemented as an analog or digital control system 160. In general, control algorithm 1600 accepts a measure of the force on upper bearing 1441 as sensed, for example, by a force sensor 1401, which may be, for example, a strain gauge or other type of sensor or transducer, and provides a current I to lifting winding 171 to operate flywheel apparatus on curve portion 419 of FIG. 5.

Algorithm 1600 has a stored reference value, f**, that specifies the desired axial force on upper bearing 1441 and calculates a residual force, $f_{residual}$, which may be defined as $f_{residual} = W - k(g_{max})*I^2$. In practice, the reference value may range between 30 lbs and 400 lbs, depending upon the bearing size, specification, and mode of operation. During normal operation, the reference value may be set near the minimum preload value to minimize raceway fatigue and drag. During certain transient conditions at start-up or during a seismic event, the reference value may temporarily be set to a higher value to keep positive loading force on the bearing. The residual force, $f_{residual}$, is sensed by force sensor 1401, which produces an output signal $f_{measured}$. Algorithm 1600 subtracts f* from $f_{measured}$, to produce error signal $f_e$, which is then amplified to produce the desired amount of current I to lifting winding 171. Algorithm 1600 uses $g_{max}$, the maximum gap value, defined with reference to FIG. 4, as the distance from rotor body 121 to magnet 170. Essentially, rotor 120 is maintained in this axial position during normal operation, supported from below by bearing housing 1420. The magnetic gap, $g_{max}$, provides clearance so that backup thrust bearing 1415 is not engaged during normal operation. Thus, while rotor 120 operates at a fixed axial position, as defined by $g_{max}$, the design allows axial growth to be accommodated at the lower bearing assembly, i.e with spring 1532 allowing for axial expansion or contraction.

One embodiment of each of the methods described herein is in the form of a computer program that executes on a processing system, e.g., a one or more processors that are part of a control system. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of a carrier medium (e.g., a computer program product on a computer-readable storage medium) carrying computer-readable program code segments embodied in the medium. Any suitable computer readable medium may be used including a magnetic storage device such as a diskette or a hard disk, or an optical storage device such as a CD-ROM.

It will be understood that the steps of methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A flywheel apparatus comprising:
a flywheel housing;
a rotor having a rotor weight and a vertical axis of rotation aligned with gravity, wherein the rotor stores energy while it rotates about the vertical axis of rotation, and wherein the rotor includes a magnetic material;
a magnet, connected to the flywheel housing, configured to apply an upward off-loading force along the vertical axis of rotation, which partially counters the force of gravity on the rotor resulting in a net downward force;
an upper bearing, comprising an inner portion and an outer portion wherein the inner portion attaches fixedly to an upper shaft of the rotor, which permits rotation of the rotor about the axis of rotation; and
an upper bearing housing rigidly connected to the flywheel housing with a lower portion disposed below the bearing outer portion, which acts as a stop to substantially prevent downward axial motion by the upper bearing, wherein the upper bearing housing comprises a locking cap disposed above the upper bearing and wherein the inner portion of the upper bearing contacts the locking cap.

2. The apparatus of claim 1 further comprising:
a control system adapted to provide current to the magnet in response to measurements by one or more sensors in order to maintain a desired amount of the net downward force on the upper bearing.

3. The apparatus of claim 2 wherein the one or more sensors is a force sensor, disposed below the outer portion of the upper bearing, the force sensor providing a measurement of axial force on the upper bearing to the control system.

4. The apparatus of claim 3 wherein the control system compares the measurement of axial force to a reference value and adjusts the current to the magnet according to the difference.

5. The apparatus of claim 4 wherein the reference value may range from approximately 30 lbs to approximately 400 lbs.

6. The apparatus of claim 3 wherein the force sensor is a strain gauge.

7. The apparatus of claim 2 wherein at least one of the measurements is selected from the group consisting of the magnetic flux between the magnet and the rotor, a position of the rotor, and a force applied by the magnet on the rotor.

8. The apparatus of claim 2 wherein the control system is a closed loop control system.

9. The apparatus of claim 1 wherein the magnet includes a permanent magnet.

10. The apparatus of claim 1 wherein the inner portion of the upper bearing is press-fit with the upper shaft.

11. The apparatus of claim 1 further comprising a backup thrust bearing disposed above said locking cap configured to absorb upward vertical thrust by the upper bearing.

12. The apparatus of claim 11 wherein there is a gap between the backup thrust bearing and the locking cap.

13. The flywheel apparatus of claim 1 wherein said upper bearing housing rigidly connects to the flywheel housing.

14. The flywheel apparatus of claim 1 wherein said upper bearing housing is a part of the flywheel housing.

15. The flywheel apparatus of claim 1, further comprising:
a lower bearing housing rigidly connected to the flywheel housing, comprising a lower bearing connected that permits rotation of the rotor about the axis of rotation;
wherein the lower bearing has a slip fit with the lower bearing housing that enables axial travel of the lower bearing to account for axial dimension growth of the rotor.

16. The flywheel apparatus of claim 15, further comprising:
a spring disposed below the lower bearing and above at least a portion of the lower bearing housing, the spring configured to provide a prescribed preload force, allowing for axial dimension growth of the rotor.

17. The flywheel apparatus of claim 1 wherein said upper bearing housing supports said upper bearing from below.

* * * * *